US009429201B2

(12) United States Patent
Drewes

(10) Patent No.: US 9,429,201 B2
(45) Date of Patent: Aug. 30, 2016

(54) BRAKING DEVICE WITH A BRAKE CALIPER ATTACHMENT

(75) Inventor: Olaf Jörg Drewes, Aschaffenburg (DE)

(73) Assignee: SAF-HOLLAND GMBH, Bessenbach-Keilberg (DE)

( * ) Notice: Subject to any disclaimer, the term of this patent is extended or adjusted under 35 U.S.C. 154(b) by 2657 days.

(21) Appl. No.: 11/632,470

(22) PCT Filed: Apr. 20, 2005

(86) PCT No.: PCT/EP2005/004722
§ 371 (c)(1),
(2), (4) Date: Dec. 10, 2008

(87) PCT Pub. No.: WO2006/007892
PCT Pub. Date: Jan. 26, 2006

(65) Prior Publication Data
US 2011/0042172 A1    Feb. 24, 2011

(30) Foreign Application Priority Data

Jul. 15, 2004  (DE) .................. 20 2004 011 159
Aug. 18, 2004  (DE) .................. 20 2004 013 006

(51) Int. Cl.
*F16D 55/00*    (2006.01)
*F16D 55/226*   (2006.01)
*F16D 65/38*    (2006.01)

(52) U.S. Cl.
CPC ............. *F16D 55/226* (2013.01); *F16D 55/00* (2013.01); *F16D 2055/0008* (2013.01)

(58) Field of Classification Search
CPC .................. F16D 55/00; F16D 55/226; F16D 2055/0008; F16D 65/0056
USPC ......... 188/73.31, 73.34, 73.35, 73.36, 73.39, 188/73.45, 73.46, 73.47, 370
See application file for complete search history.

(56) References Cited

U.S. PATENT DOCUMENTS

| 4,360,079  | A  | * | 11/1982 | Belart .................. 188/73.34 |
| 6,062,349  | A  | * | 5/2000  | Boisseau et al. ........... 188/73.45 |
| 6,250,439  | B1 | * | 6/2001  | Matsuzaki ................ 188/73.31 |
| 6,305,509  | B1 |   | 10/2001 | Concialdi ................. 188/73.31 |
| 6,315,087  | B1 |   | 11/2001 | Bodin et al. .............. 188/73.45 |
| 6,343,675  | B1 |   | 2/2002  | Seymour |
| 2008/0067015 | A1 | * | 3/2008 | Thomas et al. ............ 188/73.31 |

(Continued)

FOREIGN PATENT DOCUMENTS

| DE | 43 03 417     |   | 8/1994 |
| DE | 19857074 A    | * | 6/2000 |

(Continued)

*Primary Examiner* — Melody Burch
(74) *Attorney, Agent, or Firm* — Price Heneveld LLP

(57) ABSTRACT

The invention relates to braking devices for the wheels of a motor vehicle which can be rotated around axle pins, provided with a brake caliper attachment comprising an axle-sided carrier, which can be fixed to the axle of the vehicle, and a brake-sided carrier, which can be detachably fixed thereon by means of screws, in order to receive the caliper of the brake. Axial and/or radial bearing surfaces of the axle-sided carrier or brake-sided carrier may be located on the same axial or radial plane and/or are respectively located on parallel planes which are offset in relation. The axial and/or radial bearing surfaces may be inclined on one side relative to the axial or radial plane oriented in an inner or outer direction and/or the axial and/or radial bearing surfaces may be in the form of a prism and the carriers on the bearing surfaces thereof are coupled by screws.

8 Claims, 4 Drawing Sheets

(56) References Cited

U.S. PATENT DOCUMENTS

2009/0120740 A1* 5/2009 Drewes .................. 188/73.39
2010/0012443 A1* 1/2010 Paul et al. ............. 188/73.46

FOREIGN PATENT DOCUMENTS

| EP | 1 437 521 | 7/2004 |
|----|-----------|--------|
| WO | 01/92749  | 12/2001 |

* cited by examiner

BRAKING DEVICE WITH A BRAKE CALIPER ATTACHMENT

FIELD OF THE INVENTION

The invention relates to a braking device for wheels rotatable about axle spindles of a motor vehicle with a brake caliper securement, which comprises an axle-side carrier securable on the vehicle axle and a brake-side carrier detachably securable thereon by means of bolts for receiving or forming, respectively, the brake caliper of the brake, wherein the axle-side carrier and the brake-side carrier are supported via axial, i.e. oriented in the longitudinal axle direction, as well as via radial, i.e. oriented in the transverse direction of the axle, contact faces for absorbing the force components acting in the longitudinal axle direction as well as also of the forces acting in the circumferential axle direction occurring during driving and braking operation.

BACKGROUND OF THE INVENTION

In such a known braking device the axle-side carrier is flanged over a large area via, as a rule, six fastening bolts onto an axial end face of the brake-side carrier in order to be able to absorb the forces occurring during driving and braking operation. The securing complexity is therefore relatively high. Disk brakes with a so-called tangential threaded connection are also known, in which the fastening bolts are located tangentially with respect to the circumference of brake and disk. The threaded connection points are hereby said to be better reachable, simpler mounting by utilizing standard socket wrenches and extensions as well as compressed air power screwdrivers are said to be possible and a more rapid saddle mounting to be attainable by reducing the fastening bolts to only four. Since the fastening bolts are here disposed tangentially with respect to the circumference of brake and brake disk, this type of fastening has fundamental disadvantages, in particular regarding the precise alignment of the brake caliper with respect to the brake disk.

DE 200 21 587 U1 discloses a braking device with a brake caliper developed as a fixed saddle held on a wheel axle, in which at least one brake disk is disposed such that it is displaceable on a setting means wheel hub, which can be shifted via a setting means connected with the brake caliper into a braking position between brake linings and the brake caliper. The brake caliper is herein connected with the wheel axle via one or several supporting elements and is fastenable on the supporting elements of the brake caliper via bolts located transversely to the wheel axle. Supporting elements have here an offset, in which the brake caliper is held or prevented from being displaced via a form closure. The brake caliper is in particular held in the offset with projections. The offset includes at right angles to the bolts a face, to which, at an angle, extends a further face which is located in the longitudinal plane of the bolts. The offsets extend corresponding to these faces. In this case the brake caliper must also be fastened via bolts disposed transversely to the wheel axle. The braking device requires high fabrication precision of the parts fitting to one another.

DE 198 55 275 B4 discloses a partial lining disk brake in the form of a fixed saddle brake for wheels rotatable about axle spindles of vehicles, in particular motor vehicles, with brake carriers stationary with respect to the axle spindle, and a brake housing divided parallel to the brake disk plane, whose housing halves are detachably braced against one another and with respect to the brake carrier. The brake carrier includes a recess, which receives, as a counterpart, a section of the brake housing. The recess is implemented as a reception radially outwardly open at the margin and directed toward the section of the brake housing forming the counterpiece and having a form closure in the circumferential direction of the margin. Since the brake caliper is here guided in a bifurcated axle-side brake carrier, the brake fastening also entails high expenditures in terms of fabrication engineering.

SUMMARY OF THE INVENTION

Objective of the present invention is proposing a braking device of the above described type, in which the forces occurring during braking and driving operation can be reliably absorbed at low fabrication expenditures and easy mounting.

This objective is essentially solved in a braking device of the above described type for example thereby that the axial and/or radial contact faces of the axle-side carrier or of the brake-side carrier, respectively, are each located substantially in one and the same axial or radial plane, respectively, and/or each in planes offset parallel with respect to one another, and/or that the axial and/or radial contact faces are inclined at least on one side inwardly or outwardly relative to the axial or radial plane, respectively, and/or that the axial and/or radial contact faces themselves are bent at an angle in the form of a prism, and that the carriers are held at one another on their contact faces by means of at least two axle-parallel bolts.

Therewith the axial as well as also the radial contact faces of the axle-side and of the brake-side carrier are held at one another in particular through two axle-parallel bolts. According to the invention four bolts or three bolts at a preferably asymmetric implementation of the carriers may also be provided. Hereby with a minimum of screw-connection complexity and economic fabrication of the parts reliable operational function of the braking device with brake caliper securement is attained in simple manner.

In a specific embodiment of the invention the axial contact faces are formed by short face sections spaced bilaterally apart from the vehicle axle, which are located in a plane transversely to the vehicle axle. In this way the force absorption conditions are especially favorable.

A further development of the invention further provides advantageously that the radial contact faces are formed by relatively short face sections located bilaterally spaced apart from the vehicle axle. Hereby the force absorption is also formed such that it is especially favorable.

A further embodiment of the invention provides that the face sections associated with one another of the radial and axial contact faces are disposed in lateral adjacent regions and the two bolts are provided in these regions. The function of the contact faces is hereby secured especially reliably.

The distances between the axial contact faces and between the radial contact faces further may differ from one another and the bolts may be provided in the regions of the axial face sections. In particular the axial and the radial contact faces may in this case be disposed separately from one another, wherein the radial contact faces of the axle-side and of the brake-side carrier are connected with one another by bolting.

Further aims, characteristics, advantages and application feasibilities of the invention are evident based on the following description of embodiment examples in conjunction with the drawing. All described and/or visually represented characteristics form therein by themselves or in any desired combination the subject matter of the invention, even independently of their grouping in individual claims or their reference-back.

DETAILED DESCRIPTION OF THE PREFERRED EMBODIMENT

Figure 1:
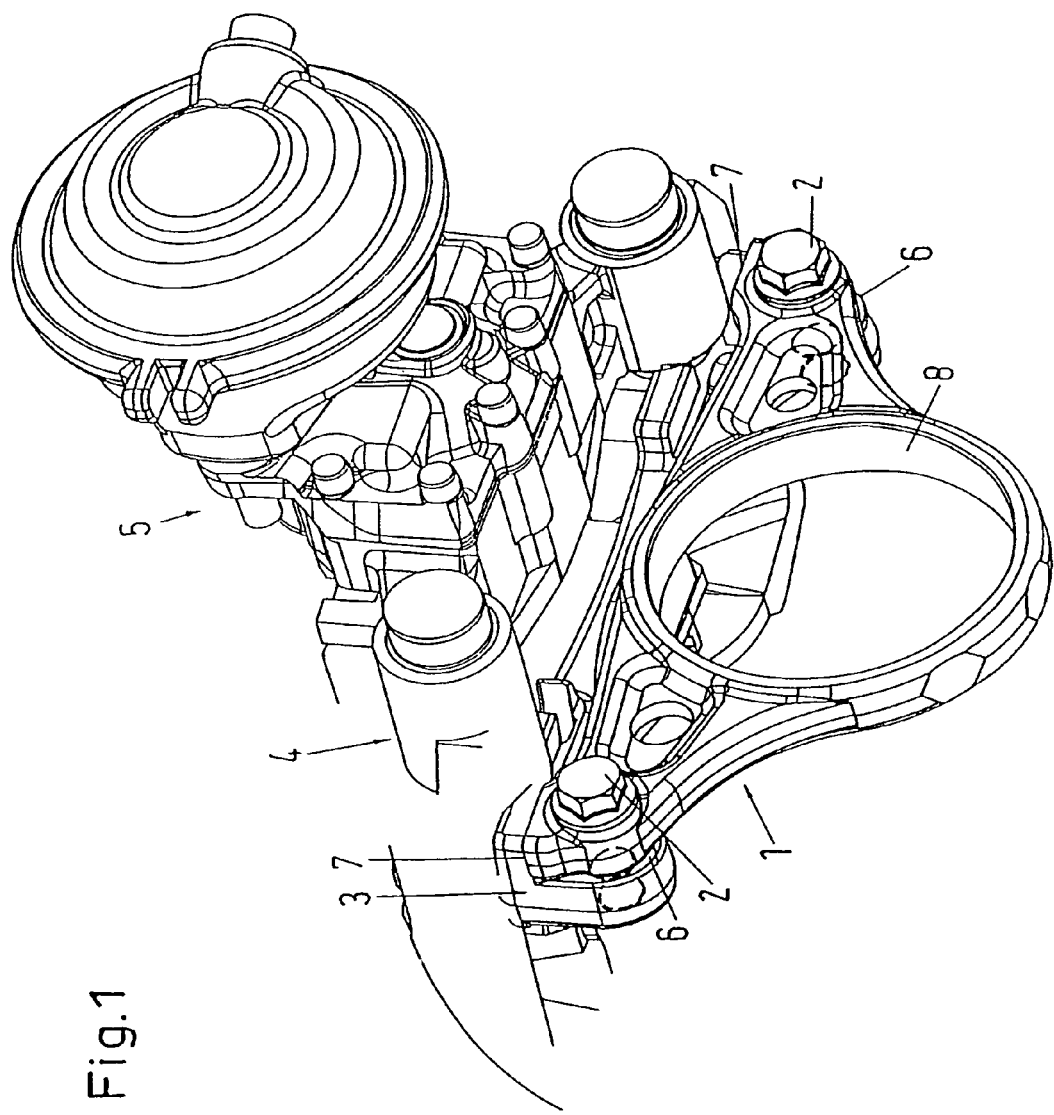
FIG. 1 is a perspective view of a braking device according to a first embodiment of the present invention.

The braking device depicted in FIG. 1 is intended for wheels of a motor vehicle rotatable about axle spindles. The braking device has a brake caliper securement, which comprises an axle-side carrier 1 and a brake-side carrier 3 for receiving a brake caliper 4 of a brake 5. The axle-side carrier 1 can be secured on the vehicle axle, for which purpose it includes a, for example, corresponding circular receiving opening 8 for a vehicle axle (not shown) developed for example as a cylindrical axle body. The brake-side carrier 3 is detachably fastened on the axle-side carrier 1 by means of two axle-parallel bolts 2 at a lateral distance from the vehicle axle and, for example, symmetrically with respect to the center longitudinal plane of the braking device. The axle-side carrier 1 and the brake-side carrier 3 are supported on one another via axial, i.e. oriented in the longitudinal axle direction, substantially planar contact faces 6 for absorbing the force components acting during the braking and driving operation in the longitudinal axle direction. The axle-side carrier 1 and the brake-side carrier 3 are further supported via radial, i.e. oriented in the transverse axle direction (upwardly or downwardly) substantially planar contact faces 7 located above the vehicle axle. Hereby the force components occurring during driving and braking operation acting in the longitudinal axle direction as well as also the forces acting in the circumferential axle direction are reliably absorbed. The axial contact faces 6 of the axle-side carrier 1 and of the brake-side carrier 3 located on both sides at a spacing from the vehicle axle somewhat above or laterally next to the geometric center axis of the vehicle axle are each substantially located in one and the same plane which extends transversely to the vehicle axle. However, they may also be offset parallel to one another in the longitudinal axle direction. In the same spacing region from the vehicle axle are also located the radial contact faces 7 of the axle-side carrier 1 and of the brake-side carrier 3, also in a substantially common plane, which, in this case, extends above the vehicle axle in the longitudinal direction of the same. The radial contact faces 7 may also be located in planes parallel to one another offset with respect to one another. The disposition is such that the distance of the two axle-parallel bolts 2 from the outer circumference of the vehicle axle corresponds approximately to the radius of the vehicle axle. However, the face sections forming the axial and radial contact faces 6, 7 are relatively short in comparison to the radius of the vehicle axle and the distance of the bolts 2 from the outer circumference of the vehicle axle.

The face sections associated with one another of the axial and radial contact faces 6, 7 are thus located in the lateral adjacent regions, as well as the bolts 2, which consequently hold the contact faces 6 securely at one another.

Figure 2:
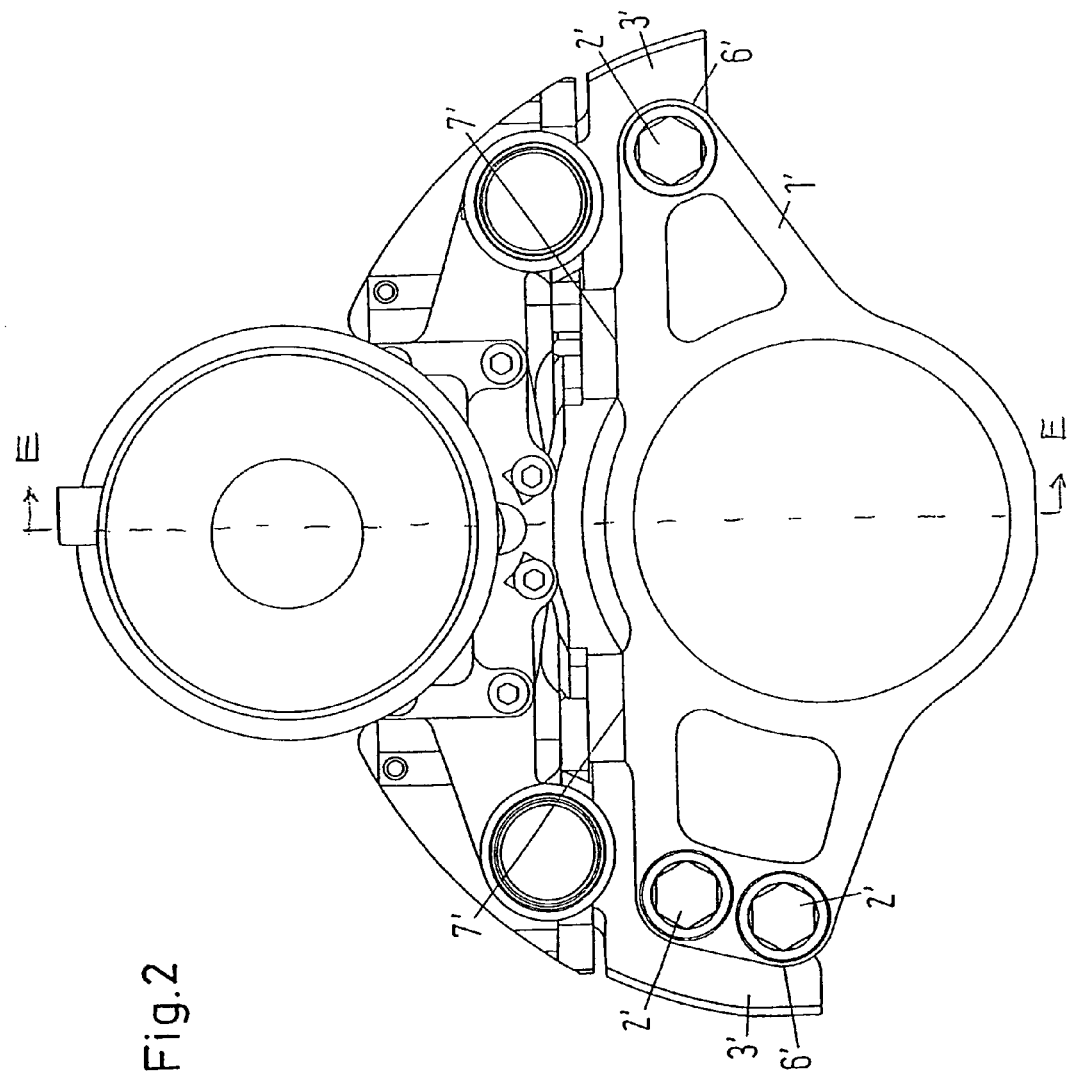
FIG. 2 is a side elevational view of a braking device according to a second embodiment of the present invention.

In contrast to the embodiment according to FIG. 1, FIG. 2 depicts further formation variants and in the following only significant differences are described.

For one, the axial contact faces 6' and the radial contact faces 7' have different distances from one another and therewith from the center longitudinal plane E of the braking device, which may be required, for example, due to structural conditions of the brake caliper 4 or different brake caliper makes.

For another, it may be sensible in terms of mounting engineering, or may even be required for reasons of brake technology, to provide on one brake carrier side or on each brake carrier side more than only one fastening bolt 2', thus, for example, four bolts 2' or three bolts 2' with a preferably asymmetric implementation of the carriers 1' and 3'.

Shown in FIG. 2 is an embodiment in which the axle-side carrier 1' and the brake-side carrier 3' are coupled to one another with a total of three bolts 2'. Viewed from the (not shown) vehicle axle, on one side of the axle-side and of the brake-side carriers 1', 3' two bolts 2' are provided in a larger axial contact face 6' and on the other side of the axle-side and brake-side carriers 1', 3' one bolt 2' is provided in a smaller axial contact face 6'. Thus, the carriers 1', 3' are formed such that they are asymmetric.

While the FIGS. 1 and 2 represent types of embodiments, in which the radial contact faces 7 are in themselves substantially planar and located to the left and right of the axle body substantially in one plane or in offset parallel planes, FIGS. 3 and 3a to 3e show embodiments, in which the radial contact faces 7 to the left and right of the axle body are not located in one plane, but, rather, are in themselves planar but placed positively or negatively obliquely with respect to one another and thereby are not substantially located in a common plane, or are already implemented to be not planar in themselves, but rather, are implemented for example, such that they are positively or negatively prismatic in the form of a V.

Figure 3:
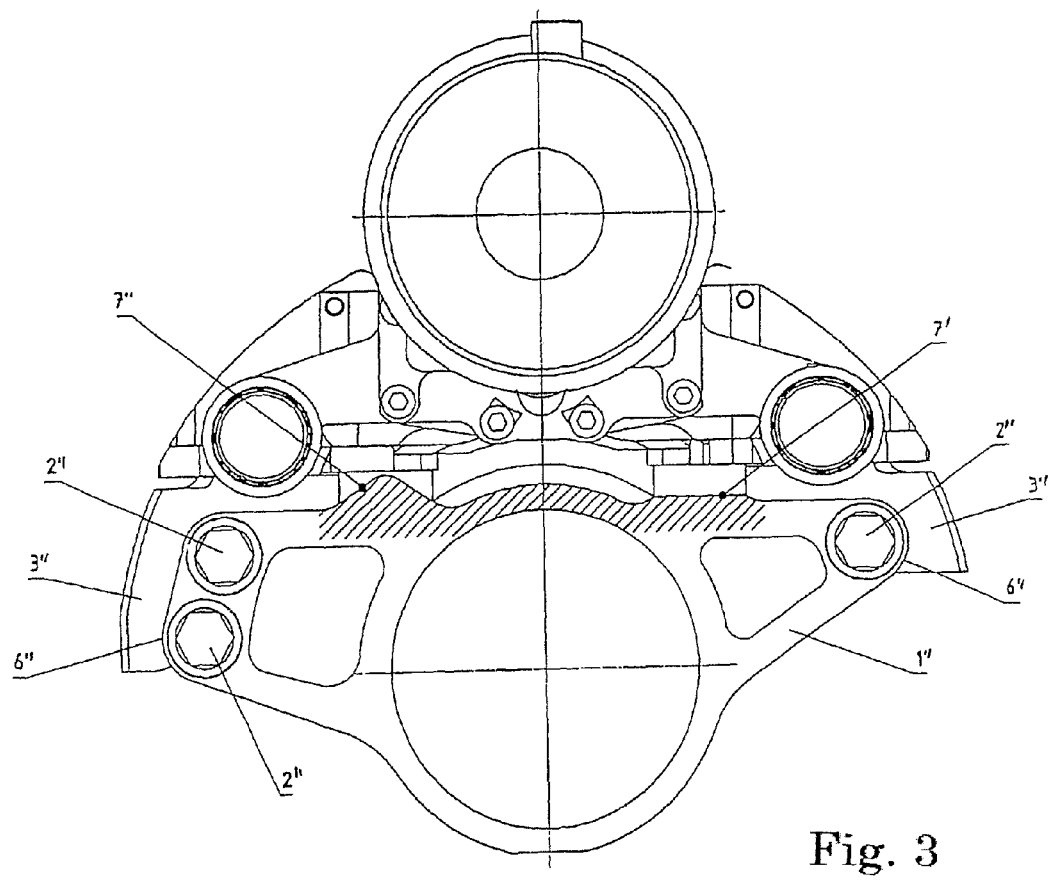
FIG. 3 is a side elevational view of a braking device as found in FIG. 2, with the implementation of radial contact faces.
Figure 3A:
FIG. 3A-3E are fragmented, side elevational views of varying radial contact faces.
Figure 3B:
Figure 3C:
Figure 3D:
Figure 3E:

For example FIG. 3 depicts a further formation which is combined from FIGS. 2 and 3e. This combination is especially advantageous, since through the radial contact face 7" forming a prismatic seat, at least on the one side of the axle- and brake-side carriers 1', 3' the alignment during the mounting is facilitated and a horizontal displacement of both structural parts on one another due to braking force is prevented, which also avoids shearing forces and loosening tendencies on the bolts 2". If only one prismatic form (7") is sufficient, it is sensible to leave the radial contact faces 7, 7' on the other side in the radial plane and planar in themselves, in order to take into consideration tolerance errors meeting the requirements of practice and fabrication and to provide on each side only one bolt 2'.

Other combinations of radial contact faces placed obliquely inwardly or outwardly inclined are evident in FIGS. 3a, 3b, 3c, 3d and 3e. Herein individual delineations can be combined in any manner with one another and/or with a planar contact face 7, 7' not placed obliquely and can also be reversed from top to bottom with respect to the position of the contact faces 7", thus for example the contact faces 7"'—prismatic in themselves—which in this case extend in the form of a V downwardly toward one another.

All combinations of obliquely or prismatically disposed radial contact faces, as described, are also applicable to the axial contact faces 6, 6', 6".

The invention claimed is:

1. A braking device for wheels of a motor vehicle rotatable about vehicle axle spindles, the braking device comprising:
    a brake caliper securement mechanism having an axle-side carrier securable on a vehicle axle and a brake-side carrier operable coupled to the axle-side carrier;
    wherein the axle-side carrier and the brake-side carrier are configured to be supported on one another by axial contact faces disposed on both the axle-side carrier and the brake-side carrier and oriented in a longitudinal axle direction, as well as also radial contact faces disposed on both the axle-side carrier and the brake-side carrier and oriented in a transverse axle direction, such that the axial contact faces absorb force components acting on the braking device in the longitudinal axle direction, and the radial contact faces absorb force components acting on the braking device in a circumferential axle direction occurring during driving and braking operation;
    the axial contact faces of the axle-side carrier and the brake-side carrier being located substantially in a same axial plane; and
    the radial contact faces of the axle-side carrier and the brake-side carrier being located substantially in a same radial plane.

2. The braking device as claimed in claim 1, wherein:
    the axial contact faces of both the axle-side carrier and the brake-side carrier are defined by relatively short face sections located on both sides of the vehicle axle in a spaced apart relationship.

3. The braking device as claimed in claim 2, wherein:
    the radial contact faces of both the axle-side carrier and the brake-side carrier are defined by relatively short face sections located on both sides of the vehicle axle in a spaced apart relationship.

4. The braking device as claimed in claim 3, wherein:
    the axial contact faces and the radial contact faces of both the axle-side carrier and the brake-side carrier are disposed in laterally adjacent axial and radial regions.

5. The braking device as claimed in claim 4, wherein:
    the axle-side carrier and the brake-side carrier are operably coupled to one another by bolts disposed on the axial region.

6. The braking device as claimed in claim 4, wherein:
    the axle-side carrier and the brake-side carrier are operably coupled to one another by bolts disposed on the radial region.

7. The braking device as claimed in claim 4, wherein:
    the axle-side carrier and the brake-side carrier are operably coupled to one another by bolts disposed on both the axial region and the radial region.

8. The braking device as claimed in claim 4, wherein:
    the axial contact faces of both the axle-side carrier and the brake-side carrier are spaced apart from each other at a first distance, and the radial contact faces of both the axle-side carrier and the brake-side carrier are spaced apart from each other at a second distance, wherein the first distance is different from the second distance.

\* \* \* \* \*